United States Patent
Malek

[15] 3,678,269
[45] July 18, 1972

[54] METHOD AND APPARATUS FOR MEASURING RADIATION ABSORPTION IN A FLUID SPECIMEN

[72] Inventor: Fritz J. Malek, Santa Barbara, Calif.
[73] Assignee: Metrophysics, Inc.
[22] Filed: Nov. 23, 1970
[21] Appl. No.: 91,952

[52] U.S. Cl. .....................250/43.5 R, 250/83.3 H, 250/218
[51] Int. Cl. .....................................................G01n 21/34
[58] Field of Search............250/43.5 R, 43.5 D, 218, 83.3 H, 250/217 R; 356/204, 205

[56] References Cited

UNITED STATES PATENTS

| | | | |
|---|---|---|---|
| 3,242,797 | 3/1966 | Sundstrom | 356/205 X |
| 3,180,984 | 4/1965 | Fertig et al. | 250/43.5 R |
| 3,487,225 | 12/1969 | Button | 356/205 X |
| 3,566,133 | 2/1971 | Dorman et al. | 356/205 X |

Primary Examiner—William F. Lindquist
Attorney—Eckhoff and Hoppe

[57] ABSTRACT

Method and apparatus for measuring the radiation absorption of a fluid specimen and more particularly wherein an electrical signal proportional to the radiant energy received through the fluid specimen is stored and compared with an electrical signal derived from a known reference source, the difference between the signals producing an output signal that is a measure of radiant energy absorbed by the fluid specimen. A pair of capacitors store the electrical signals for comparison and are connected alternately and intermittently to a radiation sensing means by a first pair of gates. A second pair of gates alternately and intermittently energize a pair of radiant energy sources, one source being used as a reference and the other source emitting radiant energy that is transmitted through a specimen fluid undergoing measurement. Both pairs of gates are operated synchronously by a gating circuit that is controlled by a clock and a flip-flop circuit.

6 Claims, 1 Drawing Figure

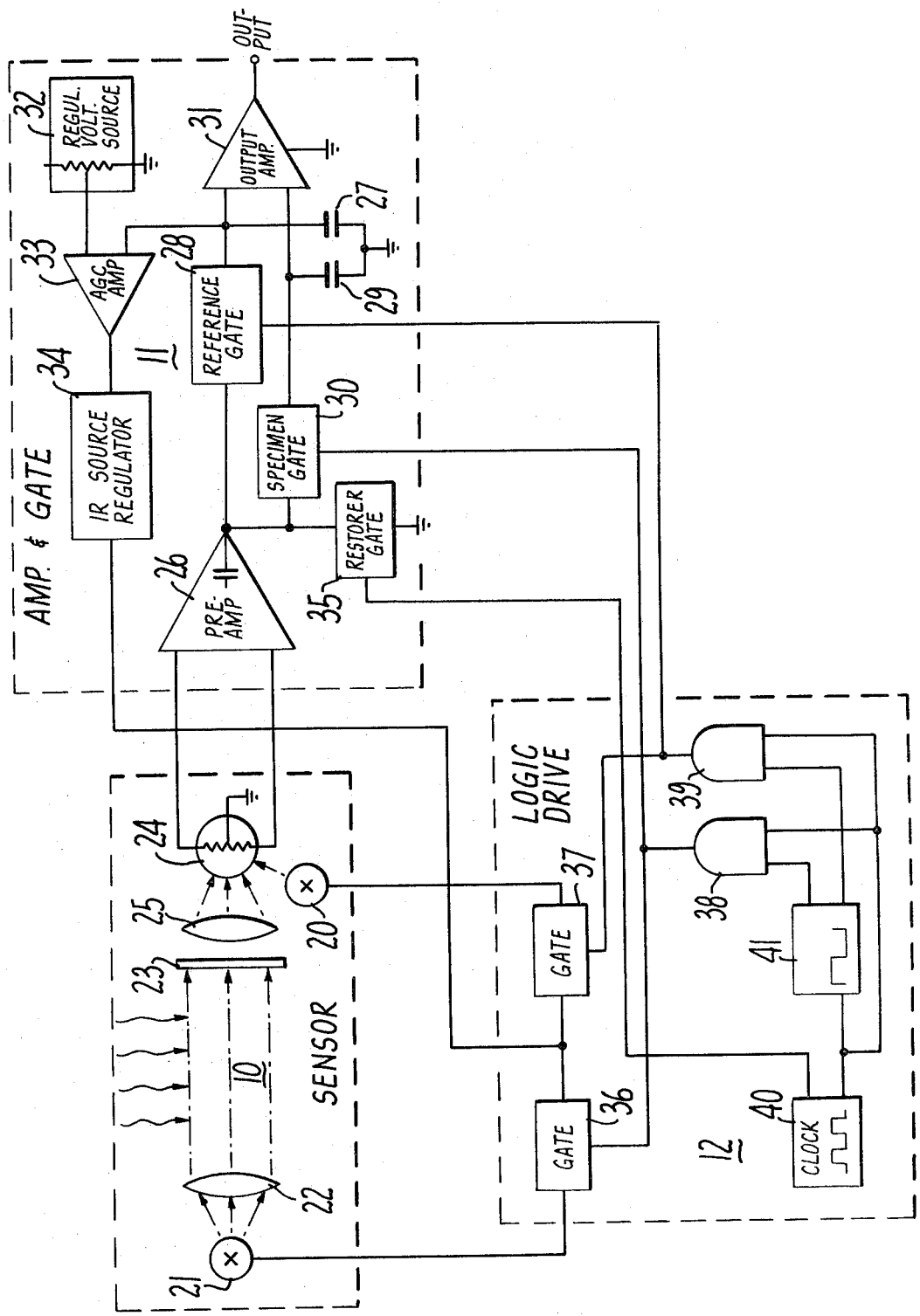

METHOD AND APPARATUS FOR MEASURING RADIATION ABSORPTION IN A FLUID SPECIMEN

The invention described herein was made in the performance of work under a N.A.S.A. contract and is subject to the provisions of Section 305 of the National Aeronautics and Space Act of 1958, Public Law 85-568 (72 Stat. 435; U.S.C. 2457).

This invention relates to optical analyzers, especially those having a sensor for measuring radiant energy from a pair of radiant energy sources. The invention is of particular utility in the construction of a sensor that measures the density of a gas, such as $CO_2$, by its absorption of radiant energy in the infra red region of the electromagnetic spectrum. In general, optical analyzers of this type employ two beams of radiant energy, one beam passing through a specimen sample of fluid and the other beam either passing through nothing or a reference cell. The beams of radiant energy are usually converged into a single beam, passed through a filter, focused upon a radiation sensor and then alternately and intermittently detected. Both mechanical apparatus and electrical circuitry have been devised for alternately exposing or energizing the two sources of radiant energy beams for comparison and detection. The present invention relates more especially to the electrical circuitry type of analyzer.

One method for comparing the relative density of gases by means of an optical analyzer having beams of radiant energy alternately and intermittently exposed by electrical circuitry is described in U. S. Pat. No. 3,180,984. This patent emphasizes the importance of a feed-back circuit, which purportedly stabilizes both the electronic circuitry and optical portions of the analyzer, and the patent teaches circuitry for balancing the intensities of radiant energy detected by a common radiation sensor. The present invention teaches another method for comparing relative density without aid of common feed-back circuits or need for balancing the radiant energy detected from two sources. The methods and apparatus of this invention also differ from the prior art in that only the radiant energy transmitted through the fluid specimen is filtered, broadband infra red radiation being transmitted from the reference source of energy and received by the detector.

In brief, the present invention provides a novel method and apparatus for comparing the relative intensities of two radiant energy sources and in which a pair of capacitors are alternately charged. One capacitor is charged by a signal that is proportional to the intensity of filtered radiant energy received through a specimen of fluid. The other capacitor is alternately charged by a signal that is proportional to broadband radiant energy transmitted by the reference source. The voltage difference between the two capacitors operates a differential amplifier which in turn produces an output that is a measure of radiation absorption of the fluid specimen. This method and apparatus provides a novel approach to the construction of a compact, inexpensive analyzer having good stability that is capable of measuring the density of gases with reliable accuracy.

It is, therefore, a principal object of the present invention to provide a novel method and apparatus for measuring the density of gases using the well known radiation absorption technique.

Another object is to provide an optical analyzer of the type described having good reliability for use in measuring the presence of $CO_2$.

Other objects of this invention will become apparent in view of the following detailed description.

In the drawing forming a part of this application, there is schematically illustrated a circuit for constructing a preferred embodiment of the invention. In general, the circuitry shown comprises three basic components or functional modules: a sensor 10, an amplifier and gating circuit 11 and a logic drive 12.

The construction of sensor 10 is essentially conventional and comprises a first source of broadband infra red radiation 20, which serves as a reference, and a second source of infra red radiation 21 that is collimated by a lens 22, transmitted through a gaseous specimen (such as $CO_2$) and a 4.3 $\mu$ filter 23. The narrow band of infra red energy passing through filter 23 is focused upon a radiation sensor 24 by a lens 25. Sensor 10 differs from conventional structures of this type in that only the radiant energy of source 21 is filtered, the broadband energy of source 20 being directly detected by sensor 24.

The first and second sources of infra red radiation are provided by subminiature lightbulbs, preferably having a minimum life of 10,000 hours. Stable performance of these lightbulbs is assured by selecting operating voltages at 75 percent of the nominal value. The suitable radiation sensor may consist of a bolometer having a compensation flake for temperature variations.

Amplifier and gate module 11 essentially comprise a preamplifier 26 connected to the output signal of radiation sensor 24. The output side of the preamplifier connects to a first storage capacitor 27 through a reference gate 28. The output of preamplifier 26 also connects to a second capacitor 29 through a specimen gate 30. Gates 28 and 30 operate alternately and intermittently, in a manner to be described, by the logic drive module 12, and when these gates are open, capacitors 27 and 29 are charged and their respective voltage charges are applied to control the output of a differential amplifier 31. The output voltage of amplifier 31 may then be measured to determine the radiation absorption of the fluid specimen in sensor 10, and this may be translated into density of a known fluid substance.

It is to be understood that drift in the radiant energy sources 20 and 21, radiation sensor 24 or preamplifier 26 will cause a change in the voltage of reference capacitor 27. A constant reference voltage and stable operation is assured by comparing the voltage of capacitor 27 with a preset stable voltage of a regulated voltage source 32. The difference in voltage is compared and amplified in an AGC amplifier 33, the output of which connects to an IR source regulator 34 connected to energy sources 20 and 21 through control circuits of logic drive 12.

Module 11 further comprises means for restoring the DC voltage reference to the output of preamplifier 26 after each operation of either reference gate 28 or specimen gate 30. A restorer gate 35 connected to the output of preamplifier 26 is provided for this purpose.

Logic drive 12 provides the essential circuitry that controls the on-time of radiant energy sources 20 and 21 and the opening and closing of reference gate 28, specimen gate 30 and restorer gate 35. More particularly, logic drive 12 comprises a first pair of gates 36 and 37 which are controlled by a second pair of gates 38 and 39. Gate 38 controls the on-time of source 21 and the charging of capacitor 29 by simultaneously opening gates 36 and 30. Similarly, gate 39 energizes source 20 and charges capacitor 27 by simultaneously opening gates 37 and 28. Gates 38 and 39 are both operated by a clock 40 having a regular and periodic on-off time and a flip-flop circuit 41. The operation of the flip-flop circuit 41 produces alternate and intermittent operation of gates 38 and 39, resulting in corresponding alternate and intermittent operation of gates 36, 37, 30 and 28. Restorer gate 35, however, is directly controlled by clock 40. Thus, the DC voltage is restored at the output of preamplifier 26 after either capacitor 27 or 29 has been charged and before a charge is placed on the other.

In a preferred embodiment of the invention, clock 40 is a free-running, unsymmetrical multivibrator having a timing that is 150 msec. OFF and 200 msec. ON. This produces or results in a full cycle time of 700 msec. and a sequence as follows:

1. DC restorer gate 35 is on for 150 msec. while clock 40 is off (0 to 150 msec.).

2. Gates 38, 36 and 30 and radiant energy source 21 are on for 200 msec. (150 to 350 msec.)

3. DC restorer gate 35 is on for 150 msec. (350 to 500 msec.)

4. Gates 39, 47 and 28 and radiant energy source 20 are on for 200 msec. (500 to 700 msec.)

In operation, it will be apparent that while source 21 and gate 30 are on, the specimen capacitor 29 is charged to a voltage level which depends on the concentration (density) of the fluid specimen (such as $CO_2$) in the sampling cavity of sensor 10. Conversely, when the radiant energy 20 and reference gate 28 are on, the reference storage capacitor 27 is charged to a level depending on the intensity of the source. Differential amplifier 31 then amplifies the voltage difference of the two storage capacitors 27 and 29 to provide an output that is a function of the radiation absorption of the fluid specimen. This output may either be measured or used to trigger an alarm.

Although a preferred embodiment of this invention has been illustrated and described, various modifications and changes may be resorted to without departing from the spirit of the invention or the scope of the appended claims, and each of such modifications and changes is contemplated.

What is claimed is:

1. A method for measuring the density of fluids by reference to its radiation absorbing characteristics comprising: producing a first electrical output signal proportional to broadband radiant energy transmitted from an IR source; storing said first electrical output signal; producing a second electrical output signal proportional to narrow band radiant energy transmitted from an IR source through a fluid specimen and a filter; storing said second electrical output signal; comparing the first electrical output signal with the voltage of a regulated reference voltage source, amplifying the difference and regulating the intensity of each IR source in accordance with any difference; comparing the first electrical output signal with the second electrical output signal and producing a third output signal proportional to the difference between said first and second electrical output signals; and measuring the density of the specimen as a function of the third output signal.

2. Apparatus for measuring the density of a fluid by reference to its radiation absorption characteristics, comprising: a first IR reference source, a second IR source for emitting radiant energy through a fluid specimen, radiation sensing means for absorbing radiant energy and producing an electrical output signal proportional to the radiant energy received from either IR source; a pair of capacitors for storing the electrical output signal of said radiation sensing means, gating means for gating the electrical output signal of said radiation sensing means to place a charge alternately and intermittently upon said capacitors; a regulated reference voltage source, means for comparing the voltage of the electrical output signal produced by radiant energy absorbed from said first IR reference source and stored by one of said capacitors with the voltage of said regulated reference voltage source, means for amplifying the difference in voltages and regulating the intensity of said first and second IR sources in accordance with any difference, a gating circuit for alternately and intermittently energizing said IR sources in synchronism with said gating means; and means for measuring the difference between the electrical charges placed upon said capacitors to thereby indicate relative density of the fluid.

3. The apparatus of claim 2, and further comprising means including a gate for restoring a reference voltage on the output of said radiation sensing means, and means for operating said gate in synchronism with said gating means and said gating circuit to restore the reference voltage each time either IR source is de-energized.

4. The apparatus of claim 2, and further comprising an electronic clock having a regular and periodic off-on time and a flip-flop circuit responsive to each off and on charge of said clock for operating said gating circuit.

5. The apparatus of claim 2, said first IR reference source being of broadband, and further comprising means for filtering the radiant energy emitted through the fluid specimen prior to being absorbed by said radiation sensing means.

6. Apparatus for measuring the density of a fluid by reference to its radiation absorption characteristics, comprising: a first IR reference source, a second IR source for emitting radiant energy through a fluid specimen, means for collimating and focusing the radiation of said second IR source, a radiation sensing means for absorbing radiant energy and producing an electrical output signal proportional to the radiant energy received from either IR source, a preamplifier connected to the output of said radiation sensing means, a first capacitor for storing an electrical charge proportional to the radiant energy received from said IR reference source, means connecting the output of said preamplifier to said first capacitor including a reference gate, a second capacitor for storing an electrical charge proportional to the radiant energy received from said second IR source, means connecting the output of said preamplifier to said second capacitor including a specimen gate, means for comparing the electrical charges impressed upon said first and second capacitors and producing an output signal proportional to the difference of the electrical charges, a gating circuit including a first pair of gates for alternately and intermittently energizing said IR sources and a second pair of gates for operating said first pair of gates in synchronism with said reference and specimen gates to alternately energize said IR sources and connect the output of said preamplifier to first one capacitor and then the other, a free running unsymmetrical multivibrator having regular and periodic off-on time, a flip-flop circuit responsive to each complete off-on cycle of said multivibrator for operating said second pair of gates, means including a restore gate for placing a reference voltage on the output of said preamplifier, and means for operating said restore gate in synchronism with said flip-flop circuit and said second pair of gates to place the reference voltage on the output of said preamplifier during the off time of said multivibrator, whereby the output signal indicates relative density of the fluid.

* * * * *